(12) United States Patent
Suzuki et al.

(10) Patent No.: US 11,383,875 B2
(45) Date of Patent: Jul. 12, 2022

(54) DOUBLE CONTAINER

(71) Applicant: YOSHINO KOGYOSHO CO., LTD., Tokyo (JP)

(72) Inventors: Masato Suzuki, Tokyo (JP); Junichi Chiba, Tokyo (JP); Masaaki Sasaki, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 226 days.

(21) Appl. No.: 16/756,086

(22) PCT Filed: Aug. 10, 2018

(86) PCT No.: PCT/JP2018/030133
§ 371 (c)(1),
(2) Date: Apr. 14, 2020

(87) PCT Pub. No.: WO2019/087515
PCT Pub. Date: May 9, 2019

(65) Prior Publication Data
US 2021/0188474 A1    Jun. 24, 2021

(30) Foreign Application Priority Data

Oct. 31, 2017 (JP) .............................. JP2017-210433
Jan. 19, 2018 (JP) .............................. JP2018-007516

(51) Int. Cl.
*B65D 1/02* (2006.01)
*B29B 11/14* (2006.01)
*B29C 49/22* (2006.01)

(52) U.S. Cl.
CPC ............ *B65D 1/0215* (2013.01); *B29B 11/14* (2013.01); *B29C 49/22* (2013.01); *B65D 1/023* (2013.01);
(Continued)

(58) Field of Classification Search
CPC .. B65D 1/0215; B65D 1/0207; B65D 1/0261; B65D 1/0223; B65D 79/0084;
(Continued)

(56) References Cited

FOREIGN PATENT DOCUMENTS

EP           1266840 A2 * 12/2002 ........... A61F 9/0008
JP           S64-26265 U    2/1989
(Continued)

OTHER PUBLICATIONS

Jul. 16, 2021 Extended Search Report issued in European Patent Application No. 18871870.4.
(Continued)

*Primary Examiner* — Robert J Hicks
(74) *Attorney, Agent, or Firm* — Oliff PLC

(57) ABSTRACT

A double container includes: an outer layer body including an outer mouth portion and a barrel portion; an inner layer body including an inner mouth portion and a containing portion; an outside air introduction port for introducing outside air; and a plurality of vertical ribs arranged with spacing in a circumferential direction on an inner surface of the outer layer body or an outer surface of the inner layer body, and each extending over the outer mouth portion to the shoulder portion or extending over the inner mouth portion to the containing portion, wherein at least one of the plurality of vertical ribs faces the outside air introduction port.

10 Claims, 8 Drawing Sheets

(52) U.S. Cl.
CPC ............... *B29B 2911/14053* (2013.01); *B29C 2049/228* (2013.01)

(58) Field of Classification Search
CPC .. B65D 79/0081; B65D 79/008; B65D 1/023; B29B 11/14; B29B 11/08; B29B 11/06; B29B 11/00
USPC ...... 215/371, 381, 376, 12.2, 12.1; 220/626, 220/609, 608, 604; 428/36.91, 36.9, 35.7
See application file for complete search history.

(56) References Cited

FOREIGN PATENT DOCUMENTS

| JP | 05042944 | A | * | 2/1993 | ............. B29C 49/24 |
|----|----------|---|---|--------|--------------------------|
| JP | 2002-068229 | A | | 3/2002 | |
| JP | 2003-192031 | A | | 7/2003 | |
| JP | 2010-082916 | A | | 4/2010 | |
| JP | 2013-208776 | A | | 10/2013 | |
| JP | 2014-091537 | A | | 5/2014 | |
| JP | 2015-145249 | A | | 8/2015 | |
| JP | 2016-030630 | A | | 3/2016 | |
| JP | 2016-088534 | A | | 5/2016 | |
| JP | 2017-065796 | A | | 4/2017 | |
| JP | 2017-114555 | A | | 6/2017 | |
| JP | 2017-178434 | A | | 10/2017 | |
| JP | 2017-196822 | A | | 11/2017 | |
| JP | 2017-222141 | A | | 12/2017 | |
| JP | 2019-018892 | A | | 2/2019 | |

OTHER PUBLICATIONS

Jul. 6, 2021 Office Action issued in Japanese Patent Application No. 2018-007516.
Feb. 22, 2021 Office Action issued in Chinese Patent Application No. 201880067778.0.
Oct. 2018 International Search Report issued in International Patent Application No. PCT/JP2018/030133.
May 5, 2020 International Preliminary Report on Patentability issued in International Patent Application No. PCT/JP2018/030133.
Dec. 14, 2021 Notification for Written Submission of Publications issued in Japanese Patent Application No. 2018-007516.
Feb. 1, 2022 Office Action issued in Japanese Patent Application No. 2018-007516.

* cited by examiner

DOUBLE CONTAINER

TECHNICAL FIELD

The present disclosure relates to a synthetic resin-made double container having a double structure including an outer layer body and an inner layer body.

BACKGROUND

As a container for containing a food seasoning such as soy sauce, a beverage, cosmetics such as a skin lotion, or a toiletry such as a shampoo, a hair conditioner, or a liquid soap as a content liquid, a synthetic resin-made double container having a double structure is known. The synthetic resin-made double container having a double structure is manufactured by blow molding a preform assembly in which an inner preform formed by injection molding is incorporated inside an outer preform formed by injection molding, and includes: an outer layer body including a cylindrical outer mouth portion and a bottomed cylindrical barrel portion connected to the outer mouth portion via a shoulder portion; and an inner layer body including a cylindrical inner mouth portion located on the inner side of the outer mouth portion and a containing portion separably laminated on the inner surface of the barrel portion and capable of volume-reduction deformation (for example, see PTL 1).

The foregoing double container is used, for example, as a squeeze-type discharge container combined with a discharge cap having a check valve, or a pump-type container combined with a pump. In this case, the content liquid can be discharged to the outside by squeezing (compressing) the barrel portion of the outer layer body or operating the pump. After discharging the content liquid, as a result of outside air being introduced between the inner layer body and the outer layer body from an outside air introduction port formed in the outer layer body, the outer layer body alone can be restored to the original shape while the containing portion of the inner layer body remains volume-reduction deformed. With this double container, the content liquid contained in the containing portion of the inner layer body can be discharged to the outside without replacing it with outside air, so that contact of the content liquid contained inside the inner layer body with outside air can be reduced and degradation, degeneration, and the like of the content liquid can be suppressed.

CITATION LIST

Patent Literature

PTL 1: JP 2017-178434 A

SUMMARY

Technical Problem

However, in the conventional double container formed by blow molding the preform assembly in which the inner preform is incorporated inside the outer preform, if the outside air introduction port for introducing outside air between the inner layer body and the outer layer body is formed in the outer mouth portion of the outer layer body, an air passage from the outside air introduction port to between the shoulder portion and the containing portion cannot be secured appropriately. There is thus the possibility that, after the content liquid is discharged, outside air is not introduced between the barrel portion and the containing portion through the part between the shoulder portion and the containing portion, and the containing portion is not volume-reduction deformed.

It could therefore be helpful to provide a double container that can reliably secure an air passage from an outside air introduction port formed in an outer mouth portion to between a barrel portion and a containing portion.

Solution to Problem

A double container according to the present disclosure is a double container made of a synthetic resin and having a double structure obtainable by blow molding a preform assembly in which an inner preform formed by injection molding is incorporated inside an outer preform formed by injection molding, the double container comprising: an outer layer body including a cylindrical outer mouth portion and a bottomed cylindrical barrel portion connected to the outer mouth portion via a shoulder portion; an inner layer body including a cylindrical inner mouth portion located on an inner side of the outer mouth portion, and a containing portion separably laminated on an inner surface of the barrel portion and capable of volume-reduction deformation; an outside air introduction port for introducing outside air between the outer layer body and the inner layer body; and a plurality of vertical ribs arranged with spacing in a circumferential direction on an inner surface of the outer layer body or an outer surface of the inner layer body, and each extending over the outer mouth portion to the shoulder portion or extending over the inner mouth portion to the containing portion, wherein at least one of the plurality of vertical ribs faces the outside air introduction port.

Preferably, in the double container according to the present disclosure, the outside air introduction port is a through hole formed through the outer mouth portion.

Preferably, in the double container according to the present disclosure, respective outside air introduction ports are provided on both sides of an axial center of the outer mouth portion, and a plurality of vertical ribs face one of the outside air introduction ports, and a plurality of vertical ribs face an other one of the outside air introduction ports.

Preferably, in the double container according to the present disclosure, the plurality of vertical ribs are arranged with equal spacing in the circumferential direction on a whole circumference of the inner surface of the outer layer body or on a whole circumference of the outer surface of the inner layer body.

Preferably, in the double container according to the present disclosure, the outer layer body and the inner layer body are each made of polyethylene terephthalate.

Preferably, in the double container according to the present disclosure, the plurality of vertical ribs are provided on the outer surface of the inner layer body.

Preferably, in the double container according to the present disclosure, the plurality of vertical ribs are provided on the inner surface of the outer layer body.

Preferably, in the double container according to the present disclosure, the barrel portion is elastically deformable by squeezing.

Preferably, the double container according to the present disclosure comprises a neck ring provided on an outer circumferential surface of the outer mouth portion on a side closer to the shoulder portion than the outside air introduction port.

Preferably, in the double container according to the present disclosure, at least each vertical rib other than a pair of vertical ribs at both ends in the circumferential direction among the plurality of vertical ribs provided in correspondence with the outside air introduction port has a notch that is cut in the vertical rib.

Advantageous Effect

It is thus possible to provide a double container that can reliably secure an air passage from an outside air introduction port formed in an outer mouth portion to between a barrel portion and a containing portion.

BRIEF DESCRIPTION OF THE DRAWINGS

In the accompanying drawings.

DETAILED DESCRIPTION

More detailed description will be given below with reference to the drawings.

Figure 1:
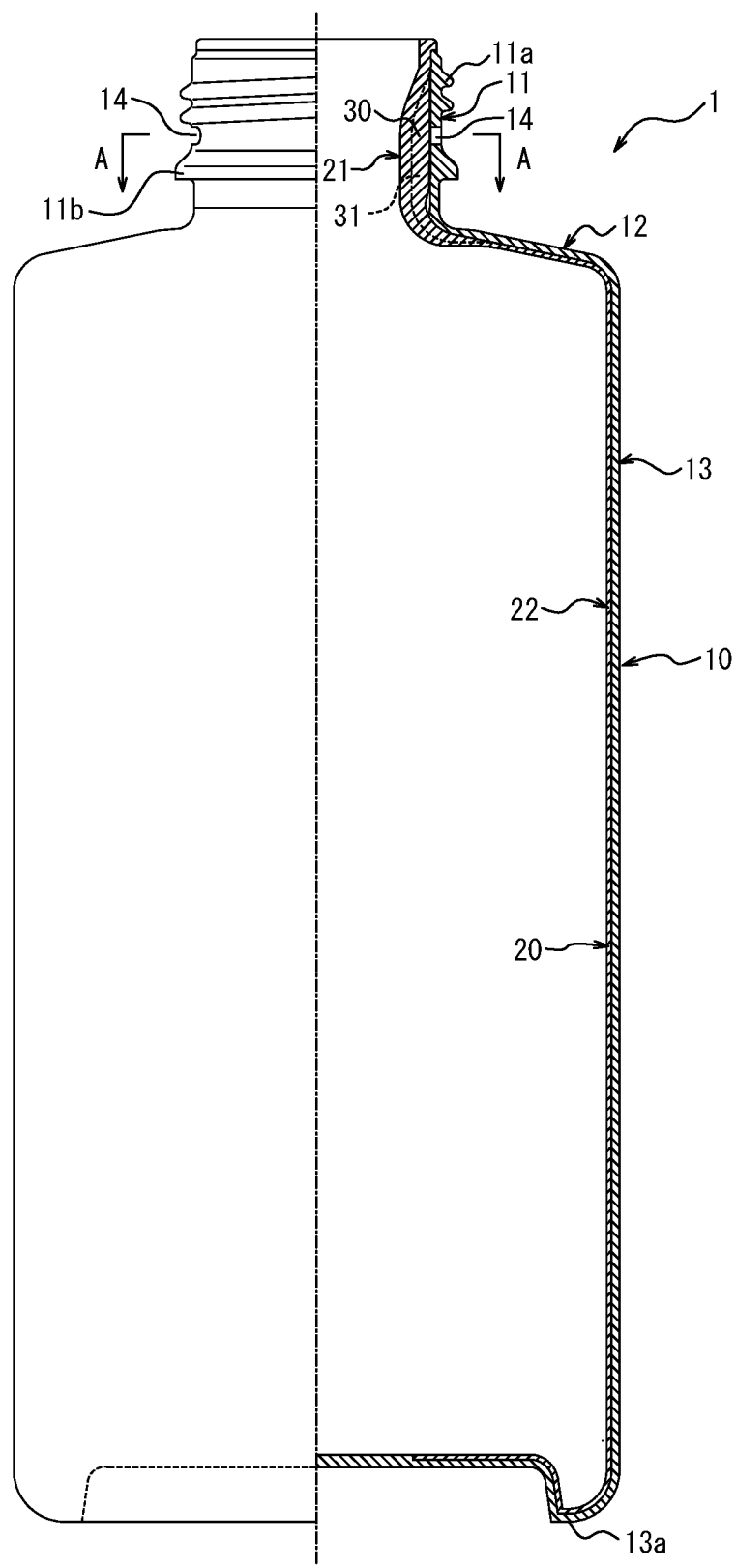
FIG. 1 is a half sectional view of a double container according to one of the disclosed embodiments.

A double container 1 according to one of the disclosed embodiments illustrated in FIG. 1 is a synthetic resin-made container called a delamination container, and has a double structure including an outer layer body 10 and an inner layer body 20. An example in which the double container 1 is used as a squeeze-type discharge container for containing cosmetics as a content liquid will be described below.

The outer layer body 10 is a part constituting an outer shell of the double container 1, and has a bottle shape including an outer mouth portion 11, a shoulder portion 12, and a barrel portion 13.

Figure 2:
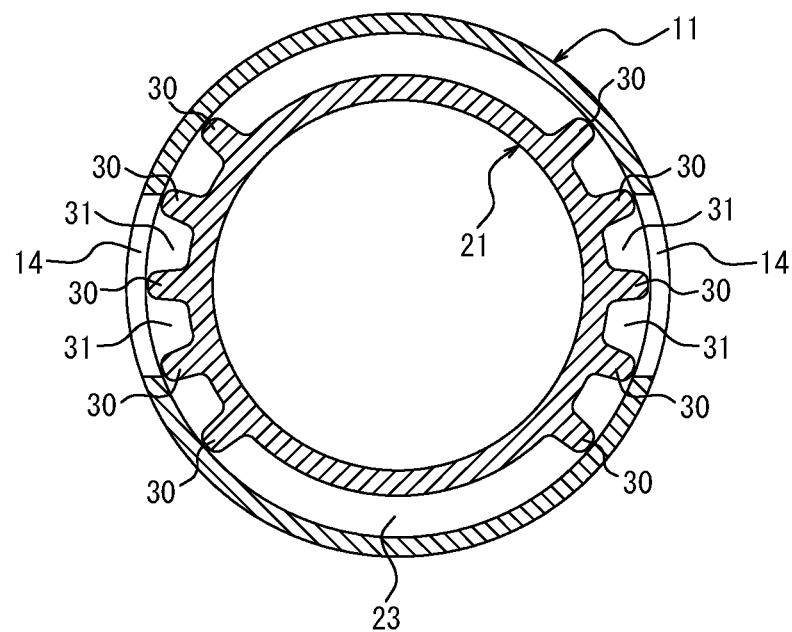
FIG. 2 is a sectional view along line A-A in FIG. 1.

The outer mouth portion 11 is cylindrical, as illustrated in FIG. 2. A male screw 11a is integrally provided on the outer circumferential surface of the outer mouth portion 11, as illustrated in FIG. 1. A discharge cap (not illustrated) having a discharge port can be attached to the outer mouth portion 11 by screw connection to the male screw 11a.

The outer mouth portion 11 may include an annular protrusion instead of the male screw 11a, so that a discharge cap can be attached to the outer mouth portion 11 by undercut engagement through capping.

The outer mouth portion 11 has a pair of outside air introduction ports 14. The pair of outside air introduction ports 14 are located symmetrically with each other on both sides of the axial center of the outer mouth portion 11. Each outside air introduction port 14 has a long hole shape extending in the circumferential direction, and passes through the outer mouth portion 11 in the radial direction. The outside air introduction port 14 communicates with the part between the outer layer body 10 and the inner layer body 20, and outside air can be introduced between the outer layer body 10 and the inner layer body 20 through the outside air introduction port 14.

A neck ring 11b is integrally provided on the outer circumferential surface of the outer mouth portion 11 on the side closer to the shoulder portion 12 than the outside air introduction port 14. The neck ring 11b has a flange shape extending on the whole circumference of the outer mouth portion 11, and projects radially outward from the outer circumferential surface of the outer mouth portion 11.

The shoulder portion 12 integrally connects to the lower end of the outer mouth portion 11, and projects radially outward over the outer mouth portion 11.

The barrel portion 13 has a bottomed cylindrical shape, and integrally connects to the outer circumferential end of the shoulder portion 12 at its upper end. That is, the barrel portion 13 connects to the outer mouth portion 11 via the shoulder portion 12. The cross-sectional shape of the barrel portion 13 may be circular, oval, or approximately rectangular.

The barrel portion 13 is flexible, and can elastically deform and dent when squeezed (compressed) and, by the elastic force, return to the original shape from the dented state by itself. As a result of the barrel portion 13 being configured to be elastically deformable by squeezing, in the case where the double container 1 is used as a squeeze-type discharge container, the content liquid discharge operation can be performed easily. Moreover, after the discharge of the content liquid, the outer layer body 10 easily returns to the original shape, thus ensuring that outside air is introduced between the outer layer body 10 and the inner layer body 20 through the outside air introduction port 14. Hence, the double container 1 can reliably achieve its functions.

A bottom part 13a at the lower end of the barrel portion 13 has a shape of being depressed on the inner side of the annular outer circumferential edge. By grounding the bottom part 13a, the double container 1 can be placed in an upright position.

In this embodiment, the outer layer body 10 is made of polyethylene terephthalate (PET). As a result of the outer layer body 10 being made of polyethylene terephthalate, the double container 1 can be a lightweight and highly transparent container.

The material of the outer layer body 10 is not limited to polyethylene terephthalate, and may be other synthetic resin material such as polyester resin, polyolefin resin, nylon resin, polycarbonate resin (PC resin), cycloolefin copolymer resin (COC resin), or cycloolefin polymer resin (COP resin).

The inner layer body 20 includes an inner mouth portion 21 and a containing portion 22.

As illustrated in FIG. 2, the inner mouth portion 21 has a cylindrical shape smaller in diameter than the outer mouth portion 11, and is located on the inner side of the outer mouth portion 11 coaxially with the outer mouth portion 11. A gap 23 with predetermined spacing is formed between the inner circumferential surface of the outer mouth portion 11 and the outer circumferential surface of the inner mouth portion 21.

Figure 3:
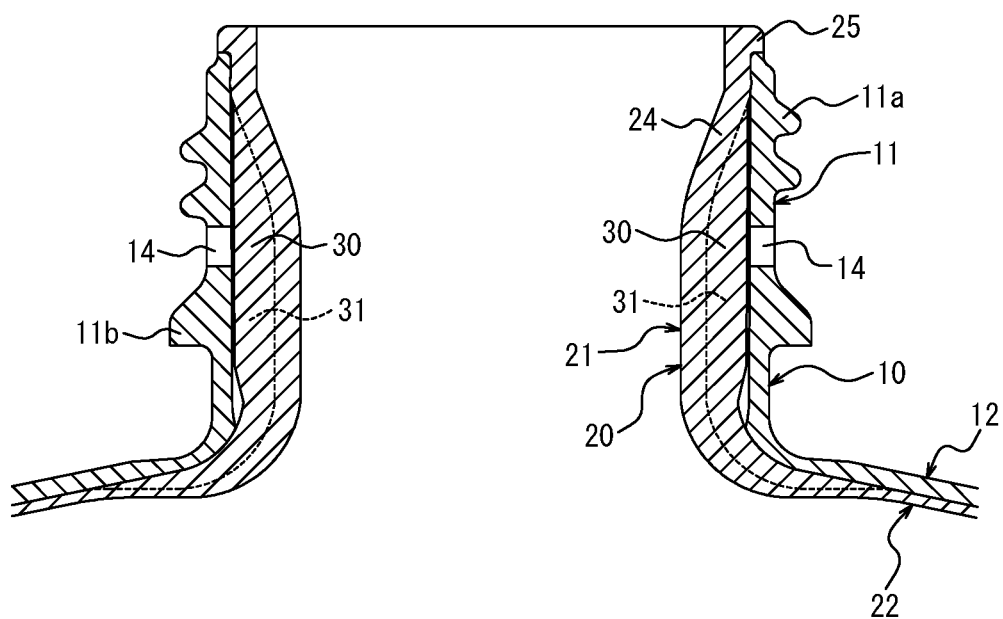
FIG. 3 is an enlarged sectional view illustrating an outer mouth portion and an inner mouth portion.

As illustrated in FIG. 3, a diameter increase portion 24 is integrally provided at the upper end of the inner mouth portion 21. As a result of the outer circumferential surface of the diameter increase portion 24 abutting the inner circumferential surface of the outer mouth portion 11 on the whole circumference, the gap 23 between the outer mouth portion 11 and the inner mouth portion 21 is blocked from the outside at the upper end of the outer mouth portion 11 or the inner mouth portion 21. A flange portion 25 extending radially outward is integrally provided at the upper end of the diameter increase portion 24. As a result of the flange portion 25 abutting the upper end of the outer mouth portion 11, the inner mouth portion 21 is positioned relative to the outer mouth portion 11 in the axial direction.

As illustrated in FIG. 1, the containing portion 22 has a bag shape thinner than the barrel portion 13. The containing portion 22 integrally connects to the lower end of the inner mouth portion 21, and is separably laminated on the inner surface of the barrel portion 13. The inside of the containing portion 22 is a space for containing the content liquid. The containing portion 22 can be filled with the content liquid through the inner mouth portion 21, and the content liquid contained in the containing portion 22 can be discharged to the outside through the inner mouth portion 21. The containing portion 22 can be volume-reduction deformed (deformed so as to reduce the inner volume) while separating from the inner surface of the barrel portion 13, with the discharge of the content liquid. Here, outside air is introduced between the outer layer body 10 and the inner layer body 20 from the outside air introduction port 14, as a result of which the barrel portion 13 alone returns to the original shape and the containing portion 22 easily separates from the inner surface of the barrel portion 13 and is volume-reduction deformed.

In this embodiment, the inner layer body 20 is made of polyethylene terephthalate. As a result of the inner layer body 20 being made of polyethylene terephthalate, the double container 1 can be a lightweight and highly transparent container.

The material of the inner layer body 20 is not limited to polyethylene terephthalate, and may be other synthetic resin material such as polyester resin, polyolefin resin, nylon resin, polycarbonate resin (PC resin), cycloolefin copolymer resin (COC resin), cycloolefin polymer resin (COP resin), or ethylene-vinyl alcohol copolymer resin (EVOH resin). In the case where ethylene-vinyl alcohol copolymer resin is used as the material of the inner layer body 20, an ethylene-vinyl alcohol copolymer resin having appropriate ethylene content may be employed in view of barrier property and flexibility. The inner layer body 20 may have, for example, a multilayer structure in which a barrier layer such as an MX nylon resin layer is provided between a pair of polyethylene terephthalate layers, to ensure barrier property.

To secure an air passage for outside air from the outside air introduction port 14 to between the barrel portion 13 and the containing portion 22, a plurality of vertical ribs 30 are integrally provided on the outer surface of the inner layer body 20.

In this embodiment, on the outer surface of the inner layer body 20, five vertical ribs 30 are arranged with equal spacing in the circumferential direction in a predetermined range in the circumferential direction with one outside air introduction port 14 at the center, and five vertical ribs 30 are arranged with equal spacing in the circumferential direction in a predetermined range in the circumferential direction with the other outside air introduction port 14 at the center, as illustrated in FIG. 2. The three vertical ribs 30 of the five vertical ribs 30 located in the predetermined range in the circumferential direction with the one outside air introduction port 14 at the center, except the two vertical ribs 30 at both ends, each face the one outside air introduction port 14. The three vertical ribs 30 of the five vertical ribs 30 located in the predetermined range in the circumferential direction with the other outside air introduction port 14 at the center, except the two vertical ribs 30 at both ends, each face the other outside air introduction port 14. The middle vertical rib 30 of the five vertical ribs 30 in the circumferential direction is located so as to lie vertically across the outside air introduction port 14 at the circumferential center position of the outside air introduction port 14.

Each vertical rib 30 projects radially outward from the outer surface of the inner layer body 20, and extends along the axial direction over the inner mouth portion 21 to the containing portion 22. That is, each vertical rib 30 extends from the position facing the outside air introduction port 14 over the neck ring 11b, bends radially outward, and reaches the shoulder portion 12. At the shoulder portion 12, the projection height of each vertical rib 30 from the outer surface of the inner layer body 20 decreases gradually. The radially outward projection end of each vertical rib 30 has a slightly rounded shape, and faces the inner circumferential surface of the outer mouth portion 11 with slight spacing at the inner mouth portion 21 and abuts the inner surface of the shoulder portion 12 at the containing portion 22. The upper end of each vertical rib 30 reaches and connects to the diameter increase portion 24.

As a result of providing a plurality of vertical ribs 30 facing each outside air introduction port 14, air passages 31 extending from the outside air introduction port 14 over the neck ring 11b to the part between the shoulder portion 12 and the containing portion 22 are formed between the outer layer body 10 and the inner layer body 20. In this embodiment, three vertical ribs 30 face each outside air introduction port 14, so that two air passages 31 between the three vertical ribs 30 are formed for each outside air introduction port 14. Each air passage 31 extends from the outside air introduction port 14 over the bent portion between the outer mouth portion 11 and the shoulder portion 12 (the bent portion between the inner mouth portion 21 and the containing portion 22) to the part between the shoulder portion 12 and the containing portion 22.

The double container 1 having such a structure can form a squeeze container when a discharge cap is attached to the outer mouth portion 11. The discharge cap in this case may have, for example, a structure including an outside air check valve for allowing outside air to be introduced into the outside air introduction port 14 and preventing outside air from flowing outside from the outside air introduction port 14 and a content liquid check valve for allowing the content liquid to be discharged and preventing backward flow of outside air into the containing portion 22.

In the double container 1 formed as a squeeze container, when the barrel portion 13 of the outer layer body 10 is squeezed (compressed), the containing portion 22 volume-reduction deforms, and the content liquid is pushed out of the discharge cap and discharged to the outside. When the squeeze is released after the content liquid is discharged, the barrel portion 13 returns to the original shape, and consequently the containing portion 22 of the inner layer body 20 separates from the inner surface of the outer layer body 10 and outside air is introduced between the outer layer body 10 and the inner layer body 20 from the outside air introduction port 14. Thus, only the barrel portion 13 returns to the original shape while the containing portion 22 remains volume-reduction deformed. In this way, the content liquid contained in the containing portion 22 can be discharged without replacing it with outside air, so that contact of the content liquid contained in the containing portion 22 with outside air can be reduced and degradation and degeneration of the content liquid can be suppressed.

In the double container 1 according to this embodiment, the plurality of vertical ribs 30 each extending over the inner mouth portion 21 to the containing portion 22 are arranged with spacing in the circumferential direction on the outer surface of the inner layer body 20, to form, between the outer layer body 10 and the inner layer body 20, the air passages 31 each of which extends from the outside air introduction port 14 over the bent portion between the outer mouth portion 11 and the shoulder portion 12 (the bent portion between the inner mouth portion 21 and the containing portion 22) to the part between the shoulder portion 12 and the containing portion 22. Hence, outside air introduced into the part between the outer mouth portion 11 and the inner mouth portion 21 from the outside air introduction port 14 when the squeezed barrel portion 13 returns to the original shape can be reliably guided to the part between the shoulder portion 12 and the containing portion 22 over the bent portion between the outer mouth portion 11 and the shoulder portion 12 through the air passage 31. In detail, in the structure in which the shoulder portion 12 is provided between the outer mouth portion 11 and the barrel portion 13, there are cases where the inner layer body 20 does not easily separate from the outer layer body 10 at the bent portion between the outer mouth portion 11 and the shoulder portion 12, and it is difficult to secure the air passage from the outside air introduction port 14 formed in the outer mouth portion 11 to between the shoulder portion 12 and the containing portion 22. However, the double container 1 according to this embodiment includes the foregoing vertical ribs 30. Therefore, even in the structure in which the shoulder portion 12 is provided between the outer mouth portion 11 and the barrel portion 13, the air passage from the outside air introduction port 14 to between the shoulder portion 12 and the containing portion 22 can be reliably secured. Thus, the containing portion 22 can be reliably separated from the inner surface of the outer layer body 10, at the shoulder portion 12. Moreover, with this separation, the air passage for outside air from the outside air introduction port 14 to between the barrel portion 13 and the containing portion 22 can be reliably secured. In addition, when the squeezed barrel portion 13 returns to the original shape, outside air can be reliably introduced between the barrel portion 13 and the containing portion 22 from the outside air introduction port 14 formed in the outer mouth portion 11. Hence, the containing portion 22 can be reliably volume-reduction deformed while separating from the inner surface of the outer layer body 10, with the discharge of the content liquid. Since the containing portion 22 can be reliably volume-reduction deformed with the discharge of the content liquid, introduction of outside air into the containing portion 22 can be reliably prevented.

In this embodiment, the outside air introduction ports 14 are provided on both sides of the axial center of the outer mouth portion 11, and the plurality of vertical ribs 30 are provided in correspondence with each outside air introduction port 14. Accordingly, with the discharge of the content liquid, the containing portion 22 can be more reliably volume-reduction deformed while separating from the inner surface of the outer layer body 10, in such a manner that the separation of the containing portion 22 from the barrel portion 13 progresses from both the right and left sides of the axial center. In the case where only one outside air introduction port 14 is formed in the outer mouth portion 11, on the other hand, the separation of the containing portion 22 from the barrel portion 13 progresses only from one side of the axial center, and the containing portion 22 compresses only on one side, which causes poor balance in the barycentric position of the double container 1.

Figure 4:
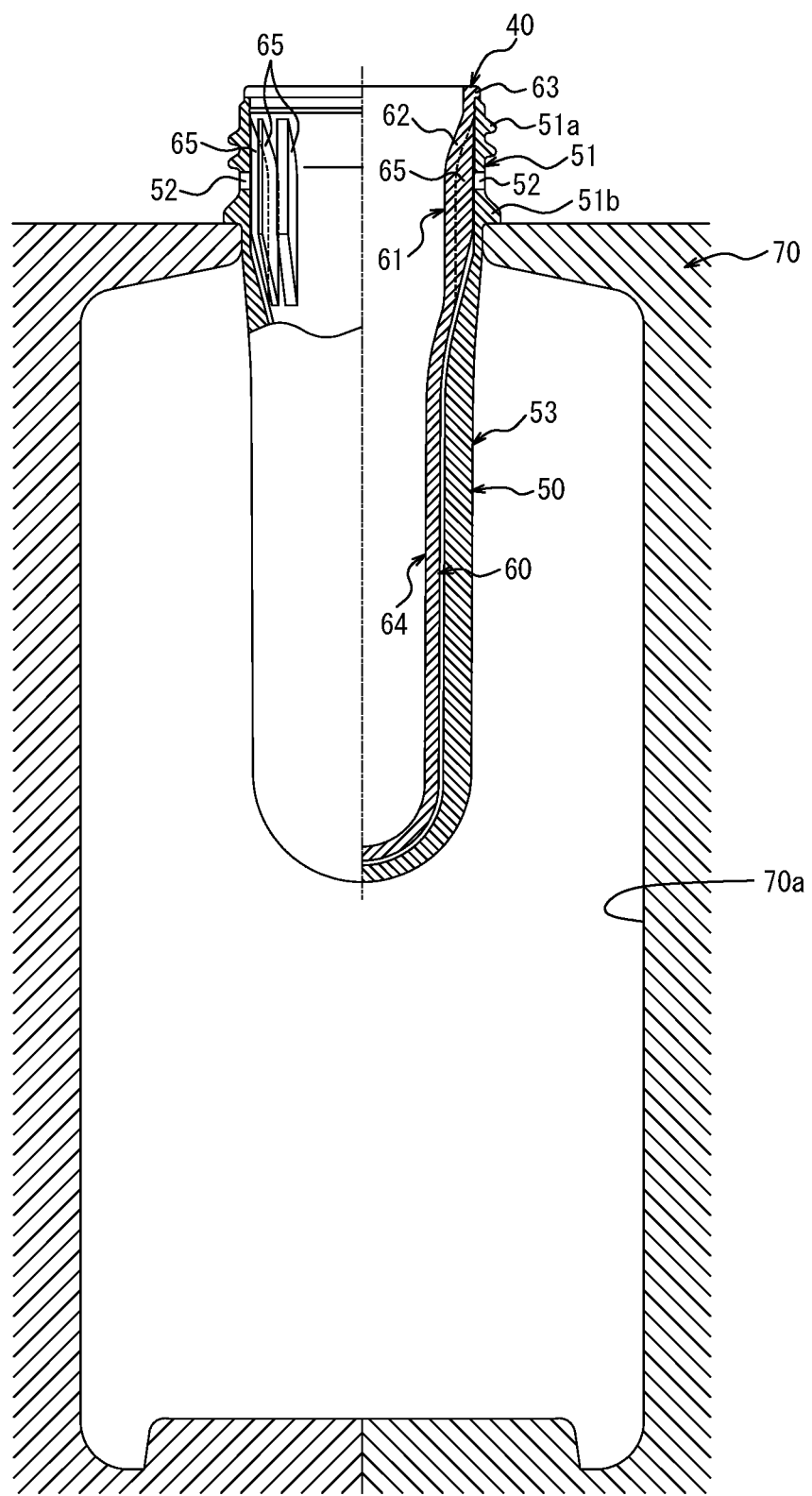
FIG. 4 is a sectional view illustrating a state in which a preform assembly is placed in a mold for blow molding.

The double container 1 having the structure described above can be formed by subjecting a synthetic resin-made preform assembly 40 illustrated in FIG. 4 to biaxial stretching blow molding.

The preform assembly 40 has a double structure in which a synthetic resin-made inner preform 60 for forming the inner layer body 20 is incorporated inside a synthetic resin-made outer preform 50 for forming the outer layer body 10.

The outer preform 50 is formed in a predetermined shape corresponding to the outer layer body 10 by injection molding the same synthetic resin material as the outer layer body 10 using a mold. In this embodiment, the outer preform 50 is made of polyethylene terephthalate, as with the outer layer body 10.

The outer preform 50 has an outer mouth portion 51 of the same shape as the outer mouth portion 11 of the outer layer body 10. That is, the outer mouth portion 51 has a cylindrical shape, a male screw 51a is integrally provided on the outer circumferential surface of the outer mouth portion 51, and a pair of outside air introduction ports 52 each of which has a long hole shape extending in the circumferential direction and passes through the outer mouth portion 51 in the radial direction are formed on both sides of the axial center of the outer mouth portion 51 symmetrically with each other. Moreover, an approximately test tube-shaped stretch portion 53 having a semispherical bottom part is integrally provided at the lower end of the outer mouth portion 51. The stretch portion 53 is thicker than the outer mouth portion 51. A neck ring 51b having a flange shape is integrally provided between the outer mouth portion 51 and the stretch portion 53.

The inner preform 60 is formed in a predetermined shape corresponding to the inner layer body 20 by injection molding the same synthetic resin material as the inner layer body 20 using a mold. In this embodiment, the inner preform 60 is made of polyethylene terephthalate, as with the inner layer body 20.

The inner preform 60 includes an inner mouth portion 61 of the same shape as the inner mouth portion 21 of the inner layer body 20. That is, the inner mouth portion 61 has a cylindrical shape smaller in diameter than the outer mouth portion 51, and is located on the inner side of the outer mouth portion 51 coaxially with the outer mouth portion 51. A diameter increase portion 62 is integrally provided at the upper end of the inner mouth portion 61. As a result of the outer circumferential surface of the diameter increase portion 62 abutting the inner circumferential surface of the outer mouth portion 51 on the whole circumference, the upper end part of the gap between the outer mouth portion 51 and the inner mouth portion 61 is blocked from the outside. A flange portion 63 extending radially outward is integrally provided at the upper end of the diameter increase portion 62. As a result of the flange portion 63 abutting the upper end of the outer mouth portion 51, the inner mouth portion 61 is positioned relative to the outer mouth portion 51 in the axial direction. An approximately test tube-shaped stretch portion 64 having a semispherical bottom part is integrally provided at the lower end of the inner mouth portion 61. The outer diameter of the stretch portion 64 is smaller than the outer diameter of the inner mouth portion 61. A gap is formed between the outer circumferential surface of the stretch portion 64 and the inner circumferential surface of the stretch portion 53, to prevent damage to the outer circumferential surface of the stretch portion 64 and the inner circumferential surface of the stretch portion 53 when incorporating the inner preform 60 inside the outer preform 50.

A plurality of vertical ribs 65 corresponding to the plurality of vertical ribs 30 are provided on the outer surface of the inner preform 60. In detail, on the outer surface of the inner preform 60, five vertical ribs 65 are arranged with equal spacing in the circumferential direction in a predetermined range in the circumferential direction with one outside air introduction port 52 at the center, and five vertical ribs 65 are arranged with equal spacing in the circumferential direction in a predetermined range in the circumferential direction with the other outside air introduction port 52 at the center. The three vertical ribs 65 of the five vertical ribs 65 located in the predetermined range in the circumferential direction with the one outside air introduction port 52 at the center, except the two vertical ribs 65 at both ends, each face the one outside air introduction port 52. The three vertical ribs 65 of the five vertical ribs 65 located in the predetermined range in the circumferential direction with the other outside air introduction port 52 at the center, except the two vertical ribs 65 at both ends, each face the other outside air introduction port 52. The middle vertical rib 65 of the five vertical ribs 65 in the circumferential direction is located so as to lie vertically across the outside air introduction port 52 at the circumferential center position of the outside air introduction port 52.

Each vertical rib 65 projects radially outward from the outer surface of the inner preform 60, and extends straight along the axial direction from the inner mouth portion 61 over the neck ring 51b to the stretch portion 64. The plurality of vertical ribs 65 are basically in the same shape as the vertical ribs 30 of the inner layer body 20, but differ from the vertical ribs 30 in that the part extending to the stretch portion 64 extends downward along the stretch portion 64 instead of extending radially outward, and the projection height from the outer surface of the inner preform 60 gradually decreases on the lower side of the neck ring 51b.

The inner preform 60 is incorporated into the outer preform 50 while being positioned relative to the outer preform 50 in the circumferential direction (the direction of rotation about the axial center) so that the three vertical ribs 65 located on one side of the inner mouth portion 61 face one outside air introduction port 52 and the three vertical ribs 65 located on the other side of the inner mouth portion 61 face the other outside air introduction port 52. To ease the positioning, a structure in which a depression or a protrusion formed at the flange portion 63 is engaged with a protrusion or a depression formed at the upper end of the outer mouth portion 51 to position the inner preform 60 relative to the outer preform 50 in the circumferential direction may be used (not illustrated in detail).

By biaxial stretching blow molding the preform assembly 40 having such a structure, the double container 1 illustrated in FIG. 1 can be manufactured.

Figure 5:
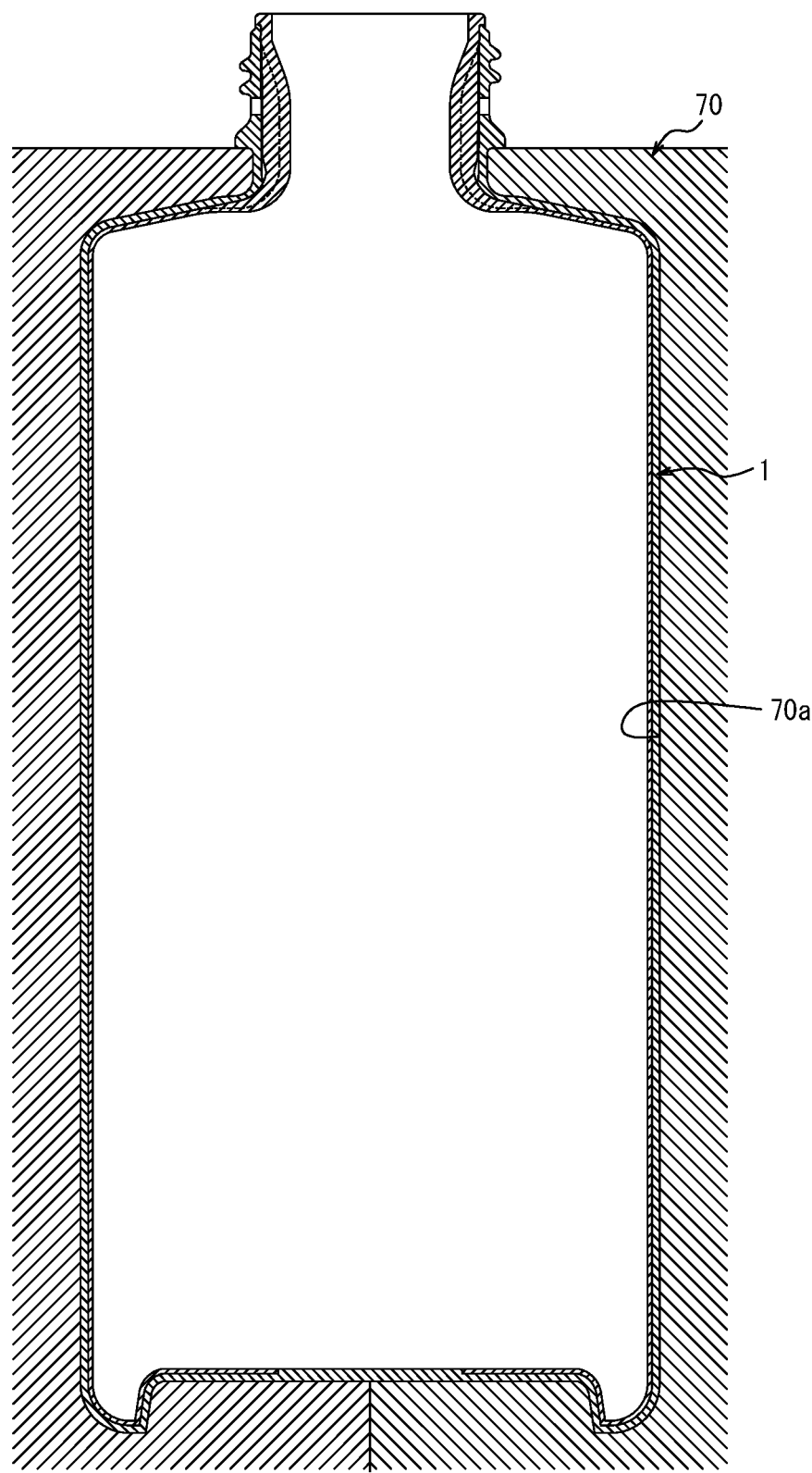
FIG. 5 is a sectional view illustrating a state in which the preform assembly is molded into a double container by biaxial stretching blow molding.

As illustrated in FIG. 4, in the biaxial stretching blow molding of the preform assembly 40, the preform assembly 40 is set in a mold 70 for blow molding included in a blow molding device so that the outer mouth portion 51 and the inner mouth portion 61 project from a cavity 70a, the neck ring 51b is supported by the upper surface of the mold 70, and the stretch portions 53 and 64 are located inside the cavity 70a, and, in this state, a pressurized medium such as pressurized air or a pressurized liquid is fed from a feeder (not illustrated) into the preform assembly 40. The stretch portions 53 and 64 of the preform assembly 40 are thus blow molded into the shapes along the inner surface of the cavity 70a, as illustrated in FIG. 5. The double container 1 can be formed in this way.

Thus, by biaxial stretching blow molding the preform assembly 40 in which the inner preform 60 formed by injection molding is incorporated inside the outer preform 50 formed by injection molding, the double container 1 having the above-described structure can be manufactured easily.

In the double container 1 according to this embodiment, the outside air introduction ports 14 are provided on both sides of the axial center of the outer mouth portion 11, and the plurality of vertical ribs 30 corresponding to each outside air introduction port 14 are provided only in the predetermined range in the circumferential direction with the outside air introduction port 14 at the center. Since the inner preform 60 for forming the double container 1 includes the plurality of vertical ribs 65 only on both sides of the axial center of the inner mouth portion 61, the inner preform 60 can be formed easily and at low cost by injection molding using a split mold.

Moreover, in the double container 1 according to this embodiment, the plurality of vertical ribs 30 are provided on the outer surface of the inner layer body 20, so that the design freedom with regard to the shape of each vertical rib 30 and the number of vertical ribs 30 can be increased.

Figure 6A:
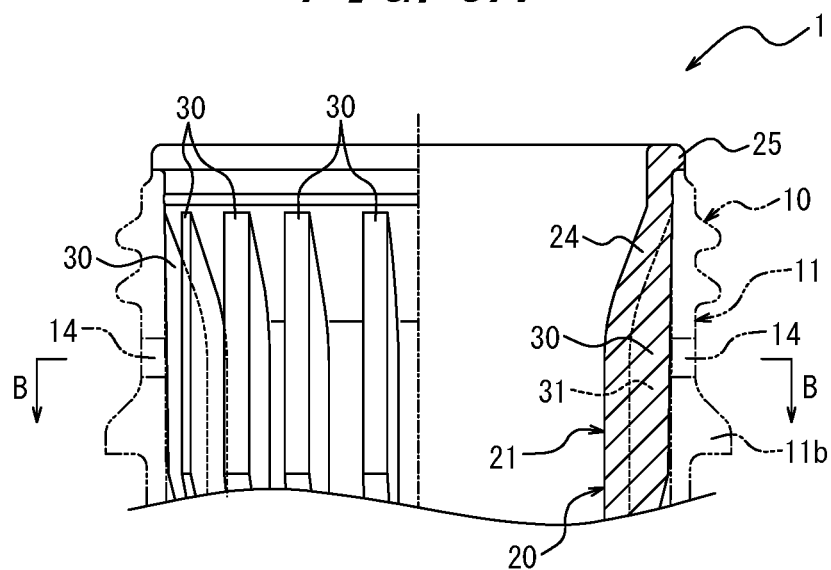
FIG. 6A is a half sectional view illustrating a modification of the inner mouth portion illustrated in FIG. 1.
Figure 6B:
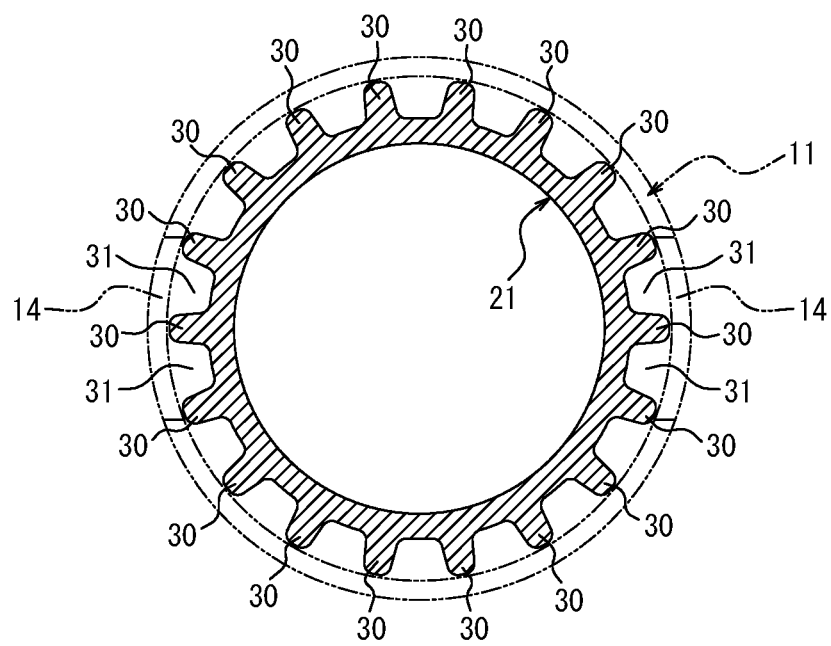
FIG. 6B is a sectional view along line B-B in FIG. 6A.
Figure 7:
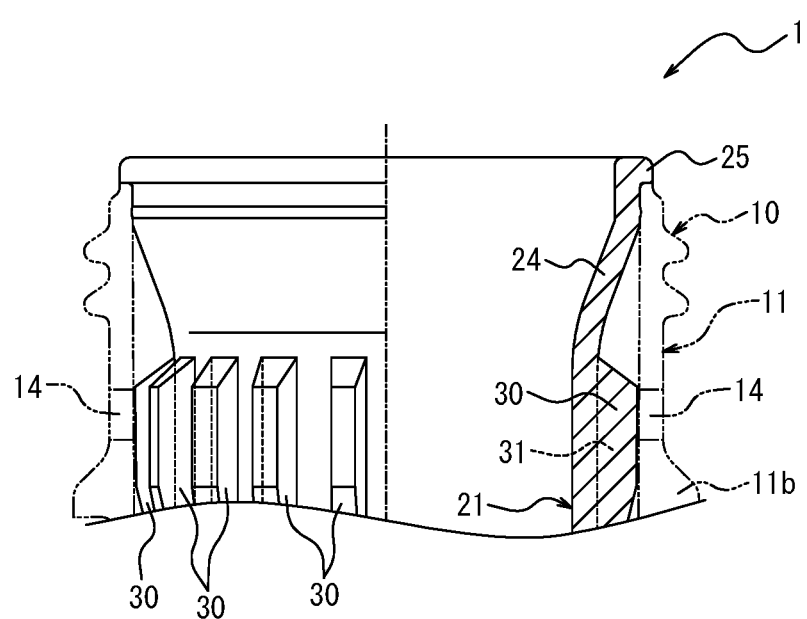
FIG. 7 is a half sectional view illustrating another modification of the inner mouth portion illustrated in FIG. 1.
Figure 8A:
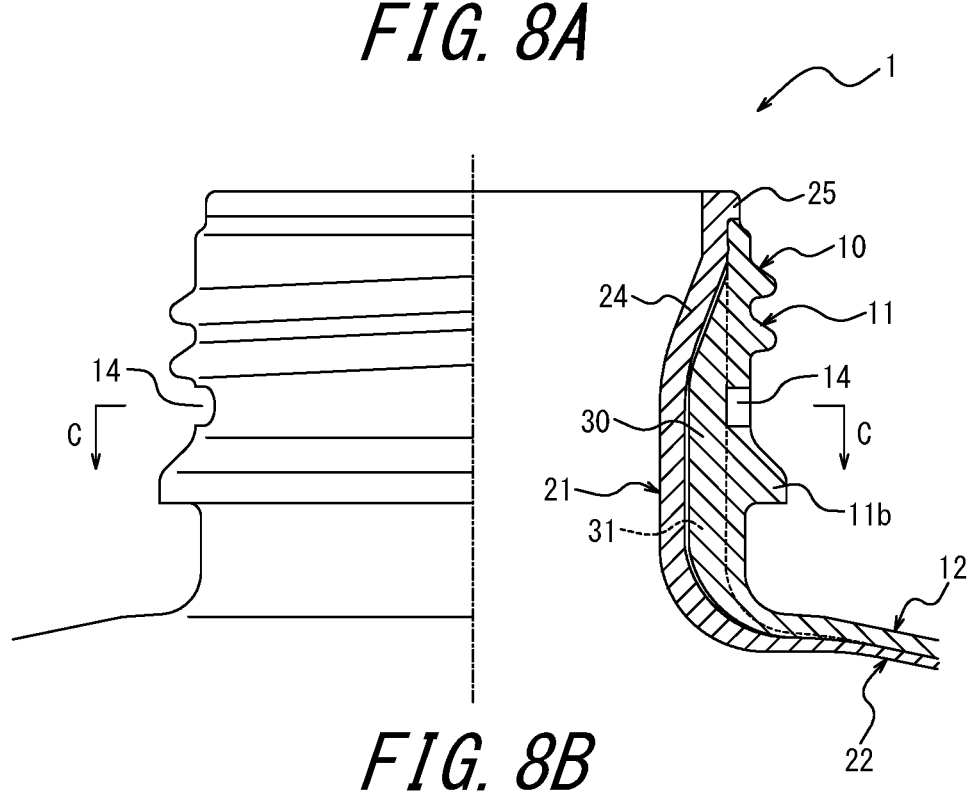
FIG. 8A is a half sectional view illustrating chief parts of a modification of the double container illustrated in FIG. 1.
Figure 8B:
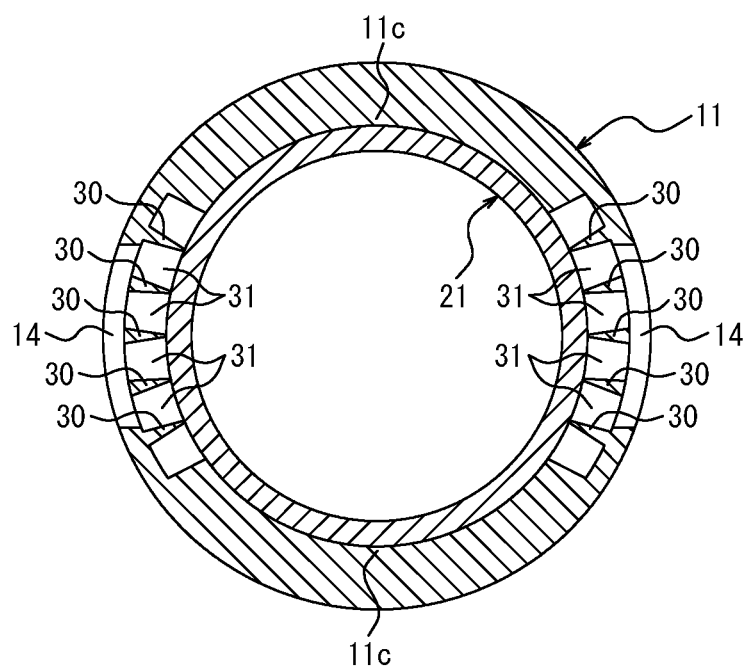
FIG. 8B is a sectional view along line C-C in FIG. 8A.
Figure 9A:
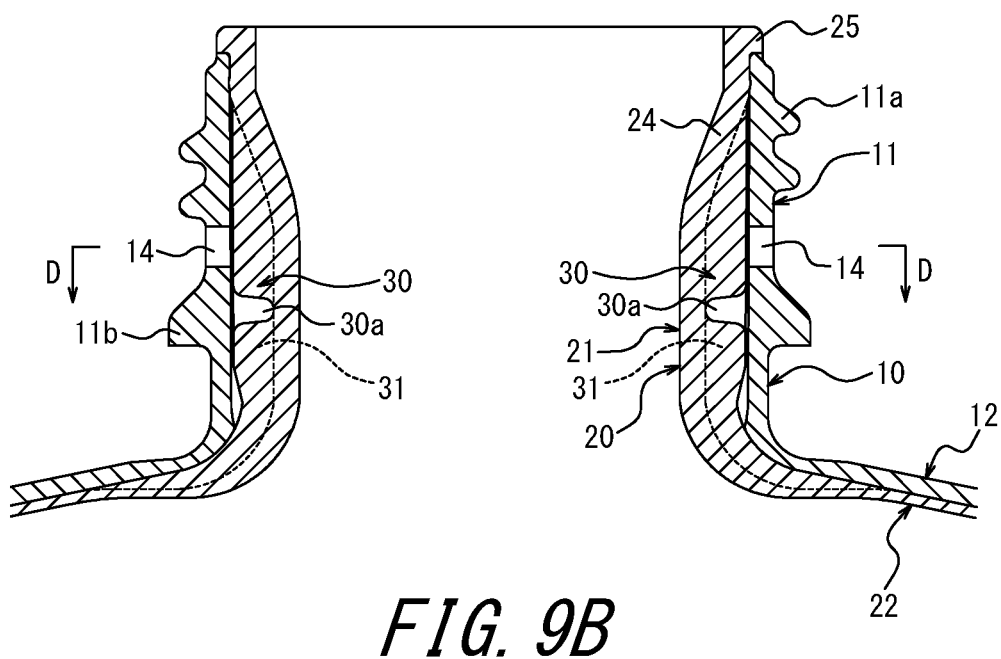
FIG. 9A is a half sectional view illustrating a modification of the vertical rib illustrated in FIG. 1.
Figure 9B:
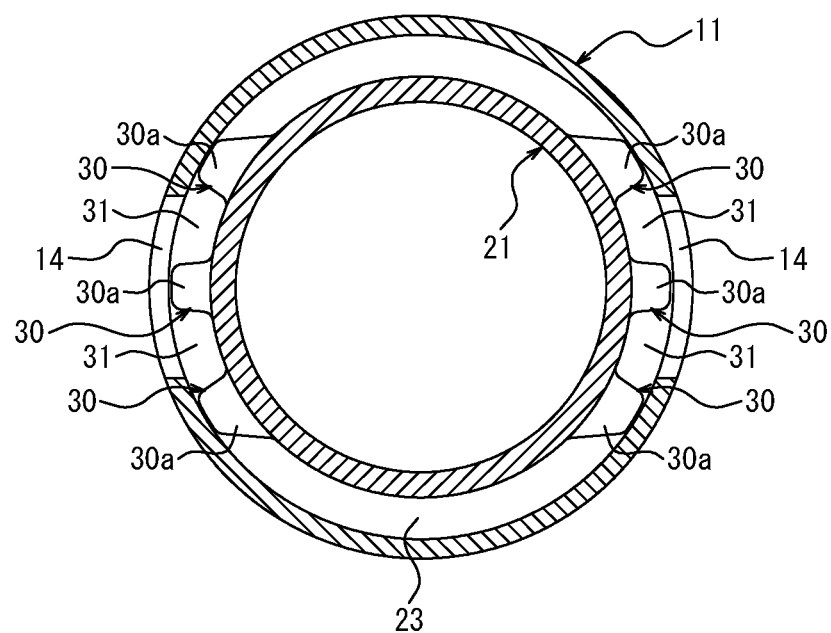
FIG. 9B is a sectional view along line D-D in FIG. 9A.

FIG. 6A is a half sectional view illustrating a modification of the inner mouth portion illustrated in FIG. 1. FIG. 6B is a sectional view along line B-B in FIG. 6A. FIG. 7 is a half sectional view illustrating another modification of the inner mouth portion illustrated in FIG. 1. FIG. 8A is a half sectional view illustrating chief parts of a modification of the double container illustrated in FIG. 1. FIG. 8B is a sectional view along line C-C in FIG. 8A. FIG. 9A is a half sectional view illustrating a modification of the vertical rib illustrated in FIG. 1. FIG. 9B is a sectional view along line D-D in FIG. 9A. In FIGS. 6 to 9, members corresponding to the foregoing members are given the same reference signs. In FIGS. 6 and 7, the outer layer body 10 is designated by two-dot chain lines, for convenience's sake.

In the double container 1 illustrated in FIGS. 1 to 3, in the structure in which the outside air introduction ports 14 are provided on both sides of the axial center of the outer mouth portion 11, the plurality of vertical ribs 30 corresponding to each outside air introduction port 14 are provided only in the predetermined range in the circumferential direction with the outside air introduction port 14 at the center. Alternatively, a plurality of vertical ribs 30 may be arranged with equal spacing in the circumferential direction on the whole circumference of the outer surface of the inner layer body 20, as illustrated in FIGS. 6A and 6B. In the case where the plurality of vertical ribs 30 are arranged with equal spacing in the circumferential direction on the whole circumference of the outer surface of the inner layer body 20, vertical ribs 30 face the outside air introduction port 14 regardless of the position of the inner mouth portion 21 relative to the outer mouth portion 11 in the circumferential direction (the position in the direction of rotation about the axial center). This makes it unnecessary to position the inner mouth portion 21 relative to the outer mouth portion 11 in the circumferential direction (the direction of rotation about the axial center), and eases the manufacture of the double container 1.

In the double container 1 illustrated in FIGS. 1 to 3, the plurality of vertical ribs 30 are shaped to connect to the diameter increase portion 24 of the inner mouth portion 21 and extend to the vicinity of the upper end of the inner layer body 20. Alternatively, the plurality of vertical ribs 30 may be shaped to only extend from, as the starting point, the position facing the outside air introduction port 14 toward the shoulder portion 12, as illustrated in FIG. 7.

In the double container 1 illustrated in FIGS. 1 to 3, the plurality of vertical ribs 30 are provided on the outer surface of the inner layer body 20. Alternatively, a plurality of vertical ribs 30 may be provided on the inner surface of the outer layer body 10, as illustrated in FIGS. 8A and 8B. FIGS. 8A and 8B illustrate the case where five vertical ribs 30 of an acute triangular sectional shape are provided on the inner surface of the outer layer body 10. Each vertical rib 30 projects radially inward from the inner surface of the outer layer body 10, and extends along the axial direction over the outer mouth portion 11 to the shoulder portion 12. That is, each vertical rib 30 extends from the position facing the outside air introduction port 14 over the neck ring 11b, bends radially outward, and reaches the shoulder portion 12. At the shoulder portion 12, the projection height of each vertical rib 30 from the inner surface of the outer layer body 10 decreases gradually. The upper end of each vertical rib 30 extends to the vicinity of the upper end of the outer mouth portion 11 facing the diameter increase portion 24.

Even in such a structure in which the plurality of vertical ribs 30 are provided on the inner surface of the outer layer body 10, the air passages 31 each of which extends from the outside air introduction port 14 over the neck ring 11b to the part between the shoulder portion 12 and the containing portion 22 can be formed between the outer layer body 10 and the inner layer body 20, so that the air passage for outside air from the outside air introduction port 14 to between the barrel portion 13 and the containing portion 22 can be reliably secured.

The part of the inner circumferential surface of the outer mouth portion 11 not provided with the vertical ribs 30 may be formed into a diameter decrease portion 11c that abuts the outer circumferential surface of the inner mouth portion 21 so as not to form the gap 23 illustrated in FIG. 2, as illustrated in FIG. 8B. By providing the diameter decrease portion 11c, when forming the preform assembly 40 into the double container 1 by biaxial stretching blow molding, the outer mouth portion 51 of the outer preform 50 can be prevented from deforming in an oval shape in cross section so as to narrow the gap 23, so that the circular shape of the outer mouth portion 11 can be maintained. In the embodiment illustrated in FIG. 2, a diameter increase portion corresponding to the diameter decrease portion 11c may be provided on the outer circumferential surface of the inner mouth portion 21 so as to close the gap 23 (not illustrated in detail). In the case where the diameter decrease portion 11c or the diameter increase portion corresponding to the diameter decrease portion 11c is provided, the air passage 31 is formed in the shape of a groove at the inner circumferential surface of the outer mouth portion 11 or the outer circumferential surface of the inner mouth portion 21.

In the case where the plurality of vertical ribs 30 are provided on the inner surface of the outer layer body 10, too, the plurality of vertical ribs 30 may be arranged with equal spacing in the circumferential direction on the whole circumference of the inner surface of the outer layer body 10, and the plurality of vertical ribs 30 may be shaped to only extend from, as the starting point, the position facing the outside air introduction port 14 toward the shoulder portion 12.

In the foregoing embodiment, at least each vertical rib 30 other than the pair of vertical ribs 30 at both ends in the circumferential direction among the plurality of vertical ribs 30 corresponding to one outside air introduction port 14 may each have a notch 30a that is cut in the vertical rib 30. FIGS. 9A and 9B illustrate the case where each of the plurality of (six) vertical ribs 30 provided on the outer circumferential surface of the inner mouth portion 21 in correspondence with the outside air introduction ports 14 has a notch 30a.

In the example illustrated in FIGS. 9A and 9B, the notch 30a of each vertical rib 30 is shaped like an approximately rectangular groove formed by cutting the vertical rib 30 in the radial direction from the outer circumferential surface facing radially outward toward the base part on the inner mouth portion 21 side, in its intermediate part in the vertical direction (longitudinal direction) (part located lower than the outside air introduction port 14). The notch 30a reaches the outer circumferential surface of the inner mouth portion 21, and accordingly the vertical rib 30 is divided vertically by the notch 30a.

With such a structure in which at least each vertical rib 30 other than the pair of vertical ribs 30 at both ends in the circumferential direction among the plurality of vertical ribs 30 corresponding to one outside air introduction port 14 has the notch 30a that is cut in the vertical rib 30, even if the inner mouth portion 21 is fixed at a position that differs from the normal position relative to the outer mouth portion 11 in the circumferential direction and the middle vertical rib 30 of the three vertical ribs 30 provided on one outside air introduction port 14 faces the outside air introduction port 14 at the circumferential end of the outside air introduction port 14, outside air introduced into one air passage 31 from the outside air introduction port 14 when the squeezed barrel portion 13 returns to the original shape can be reliably guided to the other air passage 31 shielded by the vertical rib 30 through the notch 30a. Hence, outside air can be reliably introduced between the barrel portion 13 and the containing portion 22 through the two air passages 31.

Although FIGS. 9A and 9B illustrate the case where three vertical ribs 30 are provided in correspondence with one outside air introduction port 14, the number of vertical ribs 30 provided in correspondence with one outside air introduction port 14 is variable, as long as at least each vertical rib 30 other than the pair of vertical ribs 30 at both ends in the circumferential direction among the plurality of vertical ribs 30 provided in correspondence with one outside air introduction port 14 has the notch 30a.

In the case where all of the plurality of vertical ribs 30 have the notch 30a as in this embodiment, not only outside air introduced into each air passage 31 from the outside air introduction port 14 when the squeezed barrel portion 13 returns to the original shape can be reliably guided toward the part between the barrel portion 13 and the containing portion 22 through every air passage 31, but also outside air introduced into each air passage 31 can be supplied to the region other than the air passage 31 in the gap 23 between the outer mouth portion 11 and the inner mouth portion 21 through the notch 30a. Hence, while reliably guiding outside air to the part between the barrel portion 13 and the containing portion 22 through the air passage 31, the containing portion 22 can be easily separated from the inner surface of the outer layer body 10 even in the part of the shoulder portion 12 not provided with the air passage 31.

The notch 30a is not limited to the shape illustrated in FIGS. 9A and 9B. The notch 30a may have any of various shapes as long as it is cut in the vertical rib 30. Examples include a shape not reaching the outer circumferential surface of the inner mouth portion 21, a semicircular or triangular notch shape, and a shape cut in the vertical rib 30 in the axial direction from its upper or lower end. The position and height of the notch 30a are also variable. The shape or position of the notch 30a may be different among the vertical ribs 30. The vertical ribs 30 provided on the inner circumferential surface of the outer mouth portion 11 may have the notch 30a, as in the above example.

The presently disclosed techniques are not limited to the foregoing embodiment, and various changes are possible within the scope of the present disclosure.

For example, although the foregoing embodiment describes the case where the pair of outside air introduction ports 14 are provided in the outer mouth portion 11, the number of outside air introduction ports 14 may be one or more.

Although the foregoing embodiment describes the case where the outside air introduction port 14 is shaped like a long hole extending in the circumferential direction, the outside air introduction port 14 may have any of various shapes such as circular.

Although the foregoing embodiment describes the case where the outside air introduction port 14 is a through hole formed through the outer mouth portion 11, the presently disclosed techniques are not limited to such. For example, the outside air introduction port 14 may be a gap formed between the upper end of the outer mouth portion 11 and the upper end of the inner mouth portion 21 to open the air passage 31 to the outside.

Although the foregoing embodiment describes the case where five vertical ribs 30 are provided in correspondence with each outside air introduction port 14 and three vertical ribs 30 of the five vertical ribs 30 face the outside air introduction port 14, the presently disclosed techniques are not limited to such. As long as at least one vertical rib 30 faces the outside air introduction port 14, the number of vertical ribs 30 provided in correspondence with each outside air introduction port 14 and the number of vertical ribs 30 facing the outside air introduction port 14 can be set freely.

The neck ring 11b may be omitted from the outer mouth portion 11.

The shoulder portion 12 and the barrel portion 13 may have any of various shapes.

Although the foregoing embodiment describes the case where the double container 1 is used as a squeeze-type discharge container to which a discharge cap having a discharge port is attached at the outer mouth portion 11 and that discharges the content liquid when the barrel portion 13 is squeezed, the double container 1 may be used as a pump-type container in which the barrel portion 13 has predetermined rigidity and is not easily deformable by squeezing and to which a pump-type discharge tool is attached at the outer mouth portion 11.

REFERENCE SIGNS LIST 1 double container
10 outer layer body
11 outer mouth portion
11a male screw
11b neck ring
11c diameter decrease portion
12 shoulder portion
13 barrel portion
13a bottom part
14 outside air introduction port
20 inner layer body
21 inner mouth portion
22 containing portion
23 gap
24 diameter increase portion
25 flange portion
30 vertical rib
30a notch
31 air passage
40 preform assembly
50 outer preform
51 outer mouth portion
51a male screw
51b neck ring
52 outside air introduction port
53 stretch portion
60 inner preform
61 inner mouth portion
62 diameter increase portion
63 flange portion
64 stretch portion
65 vertical rib
70 mold
70a cavity

The invention claimed is:

1. A double container made of a synthetic resin and having a double structure obtainable by blow molding a preform assembly in which an inner preform formed by injection molding is incorporated inside an outer preform formed by injection molding, the double container comprising:
   an outer layer body including a cylindrical outer mouth portion and a bottomed cylindrical barrel portion connected to the outer mouth portion via a shoulder portion;
   an inner layer body including a cylindrical inner mouth portion located on an inner side of the outer mouth portion, and a containing portion separably laminated on an inner surface of the barrel portion and capable of volume-reduction deformation;
   an outside air introduction port for introducing outside air between the outer layer body and the inner layer body; and
   a plurality of vertical ribs arranged with spacing in a circumferential direction on an inner surface of the outer layer body or an outer surface of the inner layer body, and each extending over the outer mouth portion to the shoulder portion or extending over the inner mouth portion to the containing portion,
   wherein at least one of the plurality of vertical ribs faces the outside air introduction port, and
   wherein a portion of the outer mouth portion or the inner mouth portion where the plurality of vertical ribs are provided has a cylindrical shape having a constant outer diameter over an entire circumference of the portion.

2. The double container according to claim 1, wherein the outside air introduction port is a through hole formed through the outer mouth portion.

3. The double container according to claim 2, wherein respective outside air introduction ports are provided on both sides of an axial center of the outer mouth portion, and a plurality of vertical ribs face one of the outside air introduction ports, and a plurality of vertical ribs face another one of the outside air introduction ports.

4. The double container according to claim 1, wherein the plurality of vertical ribs are arranged with equal spacing in the circumferential direction on a whole circumference of the inner surface of the outer layer body or on a whole circumference of the outer surface of the inner layer body.

5. The double container according to claim 1, wherein the outer layer body and the inner layer body are each made of polyethylene terephthalate.

6. The double container according to claim 1, wherein the plurality of vertical ribs are provided on the outer surface of the inner layer body.

7. The double container according to claim 1, wherein the plurality of vertical ribs are provided on the inner surface of the outer layer body.

8. The double container according to claim 1, wherein the barrel portion is elastically deformable by squeezing.

9. The double container according to claim 1, comprising
a neck ring provided on an outer circumferential surface of the outer mouth portion on a side closer to the shoulder portion than the outside air introduction port.

10. The double container according to claim 1, wherein at least each vertical rib other than a pair of vertical ribs at both ends in the circumferential direction among the plurality of vertical ribs provided in correspondence with the outside air introduction port has a notch that is cut in the vertical rib.

* * * * *